(12) United States Patent
Tseng

(10) Patent No.: US 8,251,578 B1
(45) Date of Patent: Aug. 28, 2012

(54) INFRARED TEMPERATURE SENSING DEVICE WITH PROJECTING FUNCTION

(75) Inventor: Chao-Man Tseng, New Taipei (TW)

(73) Assignee: Polygreen Germany GmbH, Stahnsdorf (DE)

( * ) Notice: Subject to any disclaimer, the term of this patent is extended or adjusted under 35 U.S.C. 154(b) by 0 days.

(21) Appl. No.: 13/239,361

(22) Filed: Sep. 21, 2011

(51) Int. Cl.
*G01J 5/00* (2006.01)

(52) U.S. Cl. ........................................... 374/128
(58) Field of Classification Search .................... 374/128
See application file for complete search history.

(56) References Cited

U.S. PATENT DOCUMENTS

| | | | | |
|---|---|---|---|---|
| 2003/0099277 A1* | 5/2003 | Bellifemine | ................. | 374/121 |
| 2009/0037135 A1* | 2/2009 | Lyndon et al. | ................ | 702/134 |
| 2009/0182526 A1* | 7/2009 | Quinn et al. | ................. | 702/131 |
| 2009/0304042 A1* | 12/2009 | Agronin | ........................ | 374/112 |
| 2011/0121978 A1* | 5/2011 | Schworer et al. | ............. | 340/588 |
| 2011/0134962 A1* | 6/2011 | Fraden | ......................... | 374/209 |

* cited by examiner

Primary Examiner — Lisa Caputo
Assistant Examiner — Jamel Williams
(74) Attorney, Agent, or Firm — Chun-Ming Shih; HDLS IPR Services

(57) ABSTRACT

An infrared temperature sensing device with projecting function is using for sensing temperature of a measured body. The infrared temperature sensing device includes a temperature-sensing element, a Fresnel lens, a microprocessor and a projecting module. The temperature-sensing element is used for sensing infrared radiation and deriving at least a temperature signal. The Fresnel lens is located between the measured body and the temperature-sensing element for focusing the infrared radiation on the temperature-sensing element. The microprocessor is electrically connected to the temperature-sensing element. The projecting module is electrically connected to the microprocessor and projecting at least a body temperature value corresponding to the temperature signal.

7 Claims, 6 Drawing Sheets

INFRARED TEMPERATURE SENSING DEVICE WITH PROJECTING FUNCTION

BACKGROUND OF THE INVENTION

1. Field of the Invention

The present invention relates to a temperature sensing device, and in particular to a non-contact type temperature sensing device with projecting function.

2. Description of Prior Art

Temperature is a physiological indicator of life body and can inform the health state of the life body. There are some commercially-available contact type thermometers for measuring forehead or skin temperature, however, human body under measurement may have risks of infection during temperature measuring by the contact type thermometer. Therefore, non-contact type thermometer is developed to prevent the problem mentioned above.

Conventional non-contact temperature-sensing device has a display for showing measured temperature. However, when users is located in the environment having lower light intensity or higher light intensity, the difficulty of reading the measured temperature is relatively increased, causing inconvenient of using Moreover, with the miniaturization of electronic devices, the size of the display disposed on the electronic devices is reduced such that the information showing on the display is also reduced.

SUMMARY OF THE INVENTION

It is an object of the present invention to provide an infrared temperature sensing device with projecting function, the infrared temperature sensing device with projecting function projects temperatures via a projecting module.

Accordingly, the infrared temperature sensing device with projecting function according to one aspect of the present invention is used for sensing temperatures of a measured body. The infrared temperature sensing device includes a temperature-sensing element, a Fresnel lens, a microprocessor and a projecting module. The temperature-sensing element is using for sensing infrared radiation of the measured body and derives a temperature signal. The Fresnel lens is located between the measured body and the temperature-sensing element for focusing the infrared radiation on the temperature-sensing element. The microprocessor is electrically connected to the temperature-sensing element. The projecting module is electrically connected to the microprocessor and projecting a body temperature value corresponding to the temperature signal.

The infrared temperature sensing device of the present invention derives the body temperature of the measured body via the temperature-sensing element and projects the body temperature value to the projected plane through the projecting module. Users can conveniently read the body temperature value and the body temperature value can be easily accessed by the visually-impaired persons. Moreover, the infrared temperature sensing device can adjust the intensity of the projecting light according to ambient light so as to prevent erroneous body temperature value reading cause by ambient light.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
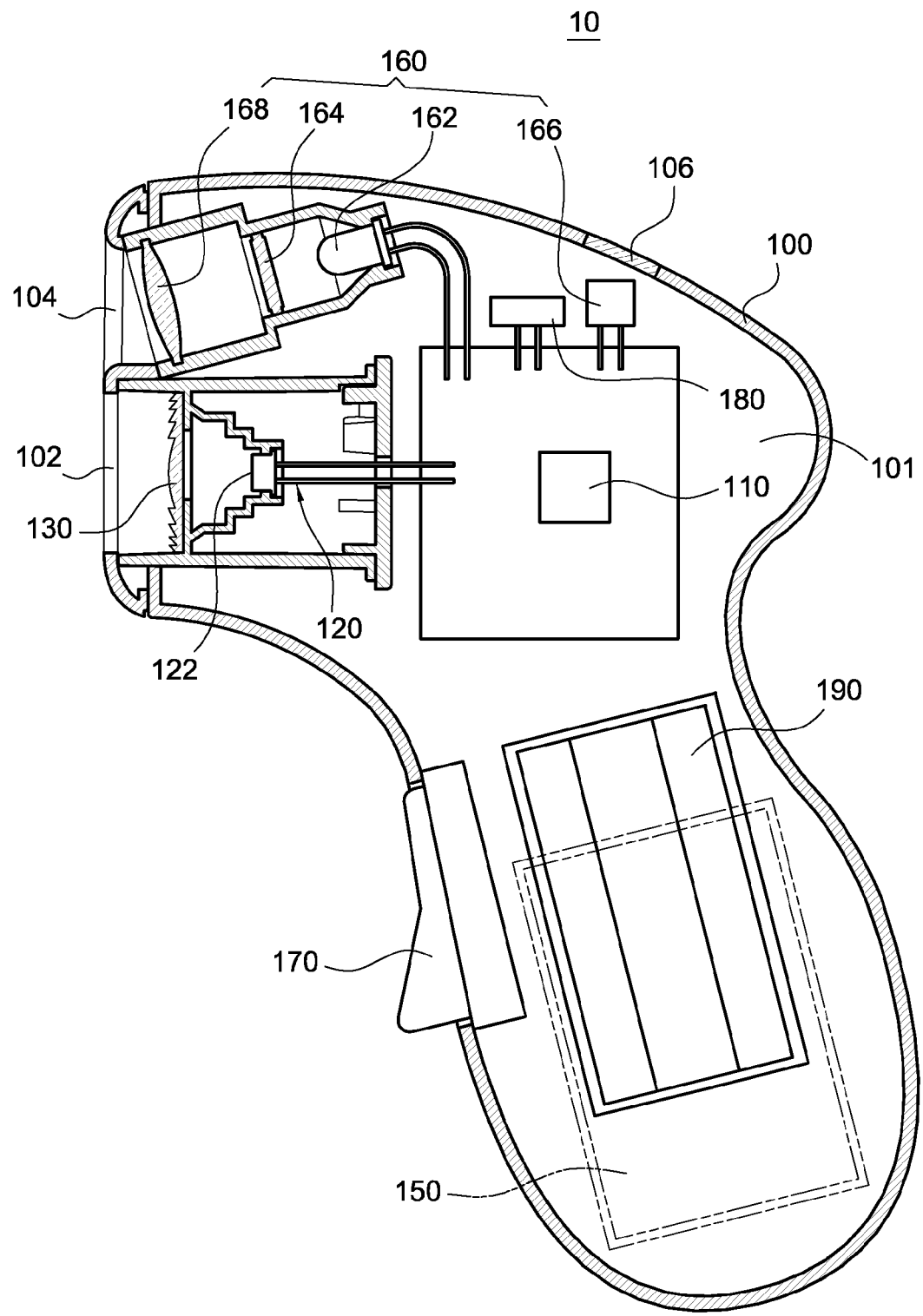
FIG. 1 is a cross-sectional view of an infrared temperature sensing device with projecting function according to a first preferred embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
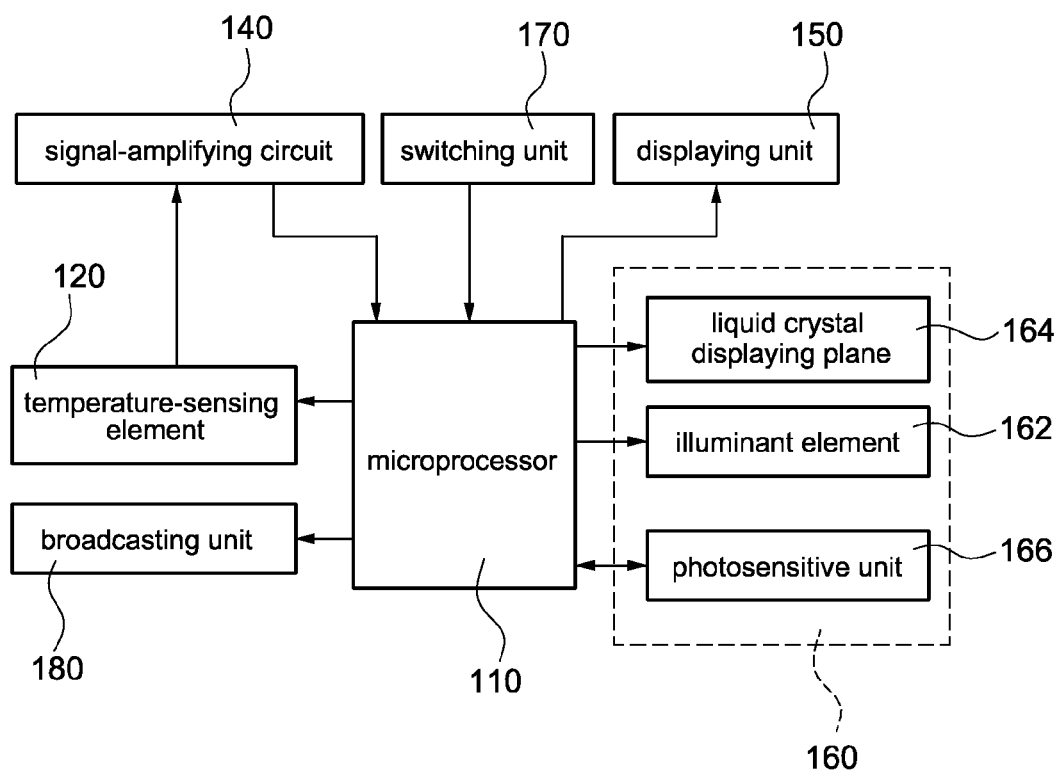
FIG. 2 is a circuit block diagram of the infrared temperature sensing device with projecting function according to the first preferred embodiment of the present invention.

Reference is made to FIG. 1 and FIG. 2, which are respectively a cross-sectional view and a circuit block diagram of an infrared temperature sensing device with projecting function according to a first embodiment of the present invention. The infrared temperature sensing device with projecting function 10 includes a housing 100, a microprocessor 110, a temperature-sensing element 120, a Fresnel lens 130, a signal-amplifying circuit 140, a displaying unit 150 and a projecting module 160.

Figure 3:
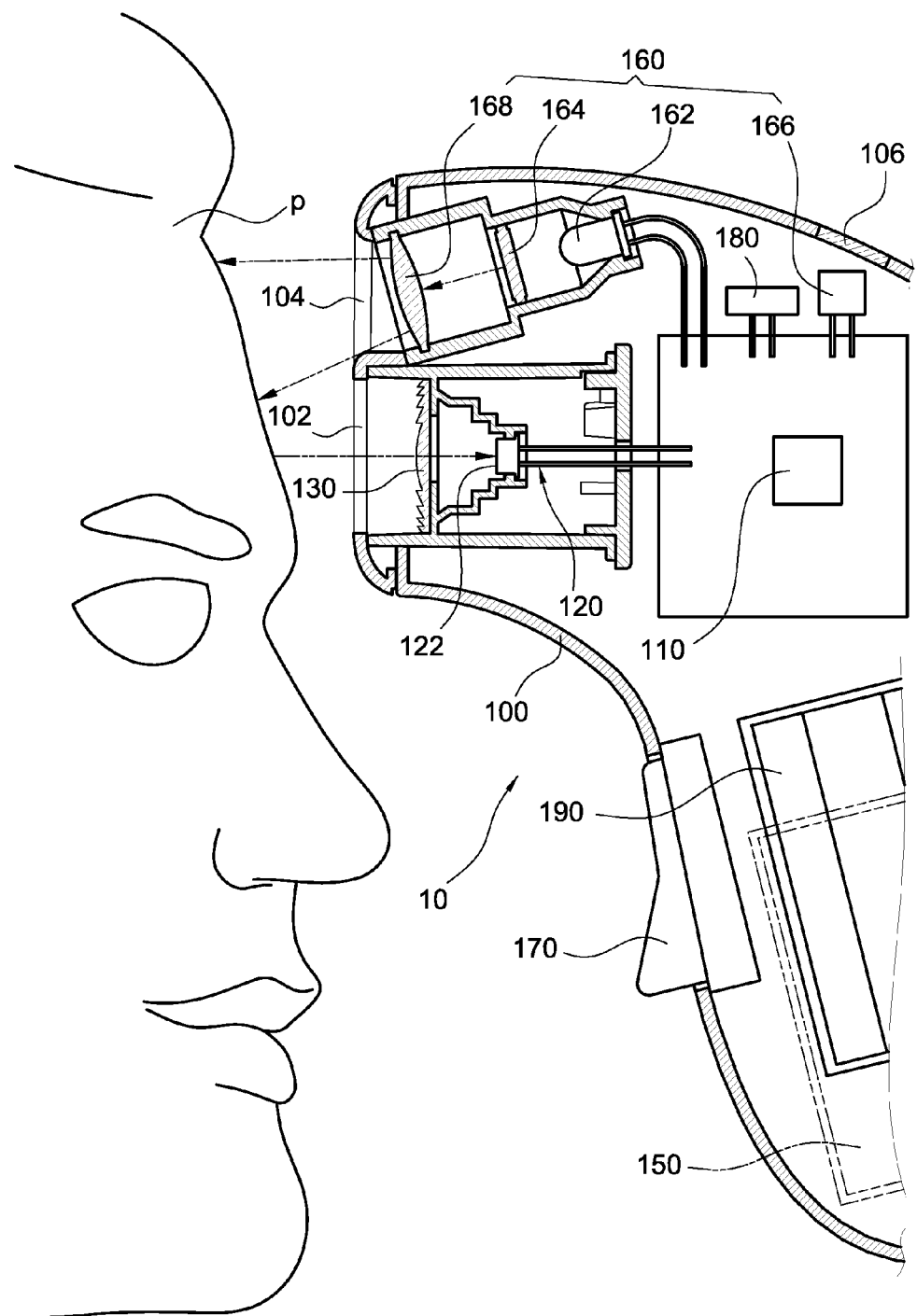
FIG. 3 is an operational diagram of the infrared temperature sensing device with projecting function according to the first preferred embodiment of the present invention.

The housing 100 includes a space 101, a first window 102, a second window 104 separately disposed with the first window 102 and a through-hole 106. In this embodiment, the second window 104 is superposed on the first window 102 so as to reduce the thickness of the housing 100. The temperature-sensing element 120 is disposed within the housing 100 and sensing at least a temperature of a measured body p via the first window 102. The temperature-sensing element 120 includes a sensing end 122 which is faced the measured body p, as shown in FIG. 3. The temperature-sensing element 120 is, but not limited to, an infrared temperature sensor for sensing infrared radiation generated by the measured body p and deriving a temperature signal.

The Fresnel lens 130 is located between the temperature-sensing element 120 and the measured body p, in particularly, the Fresnel lens 130 is located at the sensing end 122 of the temperature-sensing element 120. The Fresnel lens 130 focuses the infrared radiation generated by the measured body p on the sensing end 122 (as shown in FIG. 3) to improve the temperature-measuring precision of the infrared temperature sensing device with projecting function 10.

The signal-amplifying circuit 140 is disposed within the space 101 and electrically connected to the temperature-sensing element 120 and the microprocessor 110. The signal-amplifying circuit 140 receives the temperature signal and amplifies the temperature signal and transmits the amplified signal to the microprocessor 110.

The microprocessor 110 is disposed within the space 101 and electrically connected to the temperature-sensing element 120, the signal-amplifying circuit 140, the displaying unit 150 and the projecting module 160. The task of the microprocessor 110 is to coordinate and direct all the data transmission and operations between the elements and units and produce a measuring-identification signal while the infrared temperature sensing device 10 is activated.

The displaying unit 150 is located within the housing 100 and electrically connected to the microprocessor 110. The displaying unit 150 receives the temperature signal transmitted by the microprocessor 110 and shows a body temperature value corresponding to the temperature signal. The displaying unit 150 may be, but not limited to, a liquid crystal display (LCD).

Figure 4:
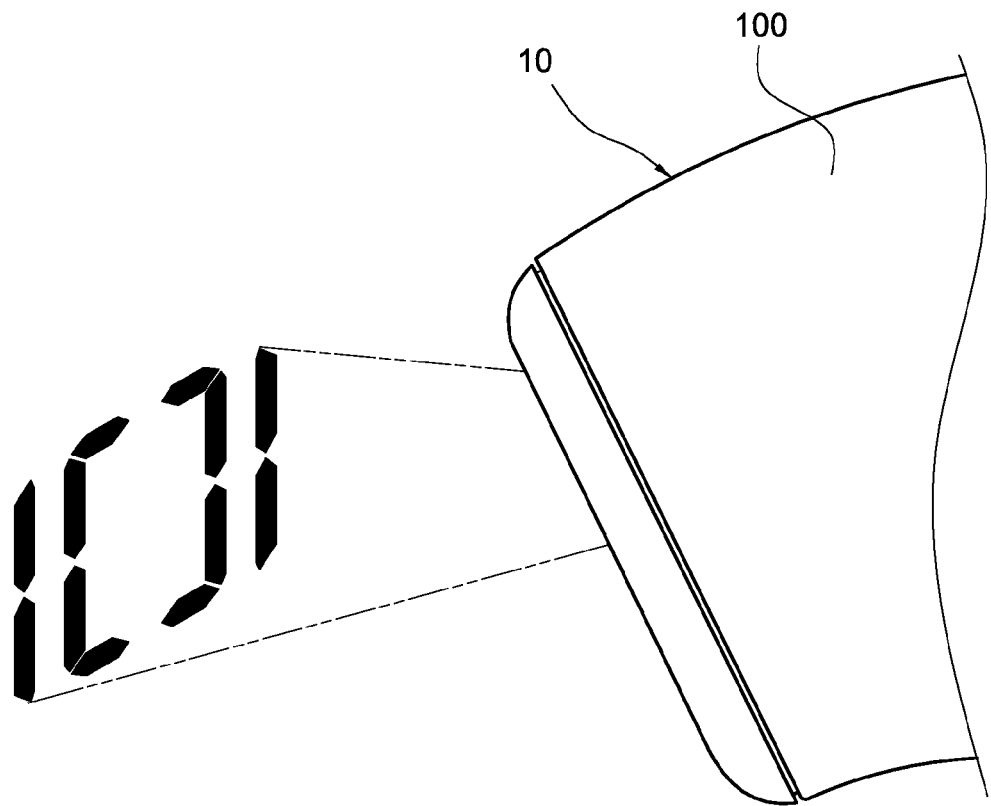
FIG. 4 is a schematic a measuring-identification image.

The projecting module 160 is disposed within the space 101 and projects the body temperature value or a measuring-identification image (showed in FIG. 4) corresponding to the measuring-identification signal via the second window 104. Because of the second window 104 is superposed on the first window 102, the projecting module 160 is disposed on the temperature-sensing element 130 so as to effectively reduce the thickness of the housing 100 and render convenient using and placing. Moreover, the projecting module 160 can effectively project the body temperature value and the measuring-identification image to a projected plane, such as forehead of the measured body p, via the second window 104. In particularly, the measuring-identification image is used for identifying temperature-measuring position of the infrared temperature sensing device 10 to prevent erroneous measurement caused by erroneous measuring position.

The projecting module 160 includes an illuminant element 162, a liquid crystal displaying plane 164 and a photosensitive unit 166. The liquid crystal displaying plane 164 is disposed within the space 101 and electrically connected to the microprocessor 110 for receiving the temperature signal or measuring-identification signal and showing the body temperature value or measuring-identification image. In this embodiment, the liquid crystal displaying plane 164 is a transmissive mode liquid crystal displaying plane for allowing light passing through and showing the body temperature value or measuring-identification image on the projected plane.

The illuminant element 162 is disposed within the space 101 and at one side of the liquid crystal displaying plane 164 and electrically connected to the microprocessor 110. In this embodiment, the illuminant element 162 is disposed at the rear end of the liquid crystal plane 164 and emits light thereto. In the practical application, the illuminant element 162 may be disposed at the lateral of the liquid crystal displaying plane 164 or providing light by reflecting mode. The light emitted by the illuminant element 162 passes through the liquid crystal displaying plane 164 and projects the body temperature value or the measuring-identification image to the projected plane shown at the liquid crystal displaying plane 164. The illuminant element 162 can be a light emitting diode (LED) or a small lamp.

The photosensitive element 166 is disposed within the space 101 and adjacent the through-hole 106 and electrically connected to the microprocessor 110. When the infrared temperature sensing device 10 is activated, the microprocessor 110 transmits an active signal to the photosensitive element 166 for sensing light intensity of ambient light via the through-hole 106 and producing an ambient light sensing signal to the microprocessor 110. The microprocessor 110 controls the conductive current of the illuminant element 162 according to the ambient light sensing signal, so that the illuminant element 162 can provide different light intensities to prevent the body temperature value or the measuring-identification image from ineffectively reading when the intensity of the ambient light is either too bright or too weak.

In particularly, the microprocessor 110 raises the conductive current to increase illuminant intensity of the illuminant element 162 when the ambient light is too bright, and lower the conductive current to decrease illuminant intensity of the illuminant element 162 when the ambient light is too weak. In this embodiment, the photosensitive element 166 includes a photoresistor.

The projecting module 160 further includes an optical lens 168. The optical lens 168 is located within the space 101 and located between the liquid crystal 164 and the measured body p. In this embodiment, the optical lens 168 is located the opposite side of the liquid crystal displaying plane where the illuminant element 162 is located. The optical lens 168 is preferably a convex for enlarging the image passing through.

The illuminant element 162 emits light to the liquid crystal displaying plane 164 when being lighting and projects the body temperature value or the measuring-identification image to the projected plane ahead the infrared temperature sensing device 10 via the optical lens 168. The optical lens 168 enlarges the body temperature value or the measuring-identification image shown on the liquid crystal displaying plane 164.

The infrared temperature sensing device 10 further includes a switching unit 170 and a broadcasting unit 180. The switching unit 170 is disposed on the housing 100 and electrically connected to the microprocessor 110. The switching unit 170 is used for turning-on or turning-off the infrared temperature sensing device 10 and activating the temperature-sensing element 120 to measure the temperature of the measured body p.

The broadcasting unit 180 is disposed within the space 101 and electrically connected to the microprocessor 110 for starting prompt and finishing measure prompt. The broadcasting unit 180 may be a buzzer or a speaker.

The infrared temperature sensing device 10 further includes a power 190. The power 190 is disposed within the space 101 and electrically connected to the microprocessor 110, the temperature-sensing element 120, the signal-amplifying circuit 140, the displaying unit 150, the projecting module 160, the switching unit 170 and the broadcasting unit 180 for providing the electric power of the infrared temperature device 10.

Figure 5:
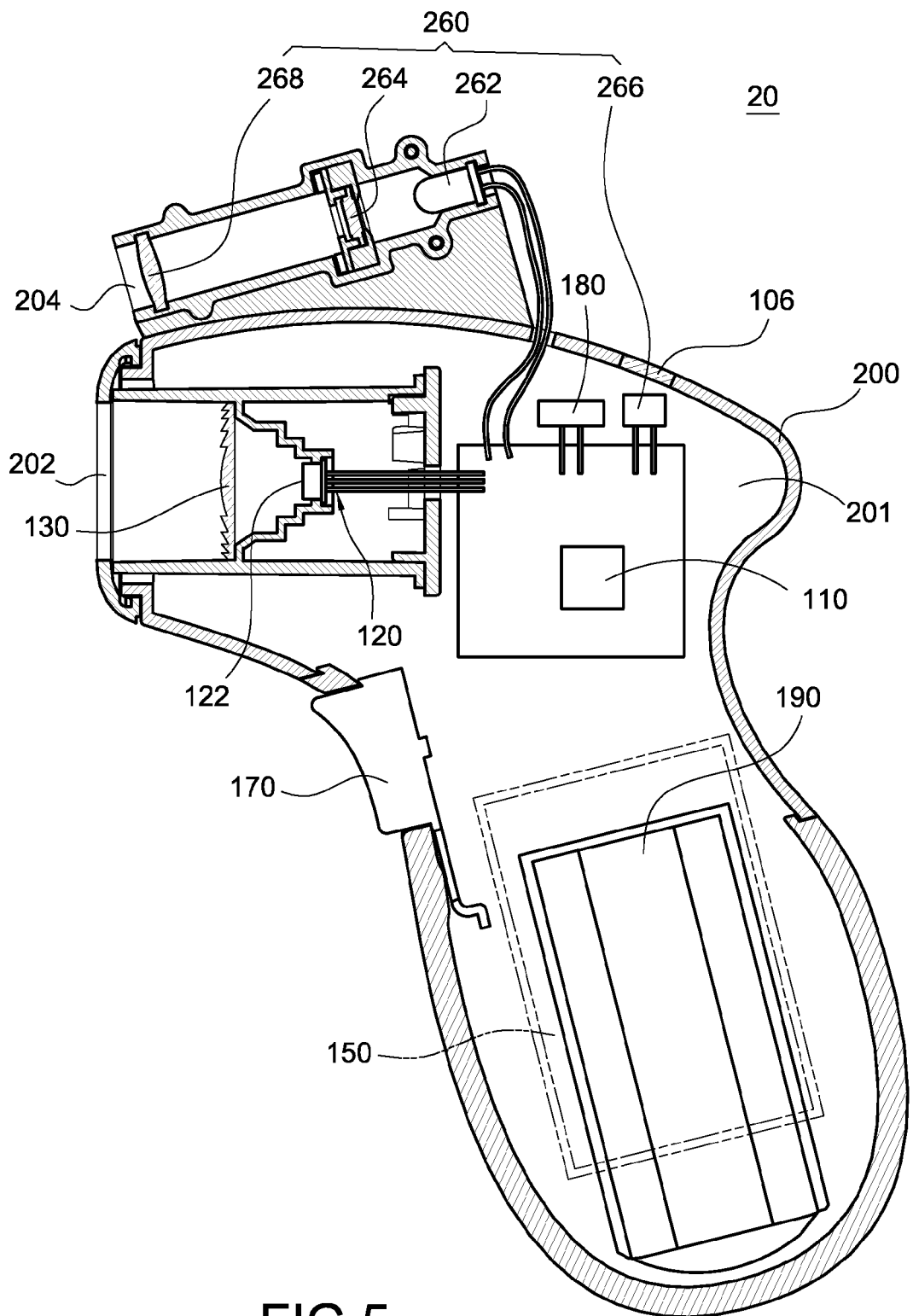
FIG. 5 is a cross-sectional view of an infrared temperature sensing device with projecting function according to a second preferred embodiment.

Reference is made to FIG. 5, which is a cross-sectional view of an infrared temperature sensing device with projecting function according to a second preferred embodiment of the present invention. The infrared temperature sensing device 20 of this embodiment is similar to the first embodiment mentioned above. The difference is that a projecting module 260 is disposed on a housing 200. The housing 200 includes a space 201 and a first window 202. The temperature-sensing element 120 senses infrared radiation of the measured body p via the first window 202 and derives a temperature signal.

The projecting module 260 projects a body temperature value corresponding to the temperature signal or a measuring-identification image via a second window 204. In this embodiment, the projecting module 260 is, but not limited to, superposed on the temperature-sensing element 120 to reduce the thickness of the housing 200 and the projecting module 260 can effectively project the body temperature value or the measuring-identification image to a projected plane, such as forehead of the measured body p. The projecting module 260 includes an illuminant element 262, a liquid crystal displaying plane 264, a photosensitive element 266 and an optical lens 268. The liquid crystal displaying plane 264 shows the body temperature value or the measuring-identification image. The illuminant element 262 and the optical lens 268 are respectively located both side of the liquid crystal displaying plane 264. The illuminant element 262 emits light to the liquid crystal displaying plane 264 for projecting the body temperature value or the measuring-identification image to the projected plane via the second window 204. The optical lens 268 is located between the liquid crystal displaying plane 264 and the measured body p and preferably a convex for enlarging the image passing through.

The illuminant element 262 emits light to the liquid crystal displaying plane 264 when being lighting and projects the body temperature value or the measuring-identification image shown on the liquid crystal displaying plane 164 to the projected plane via the optical lens 268.

Figure 6:
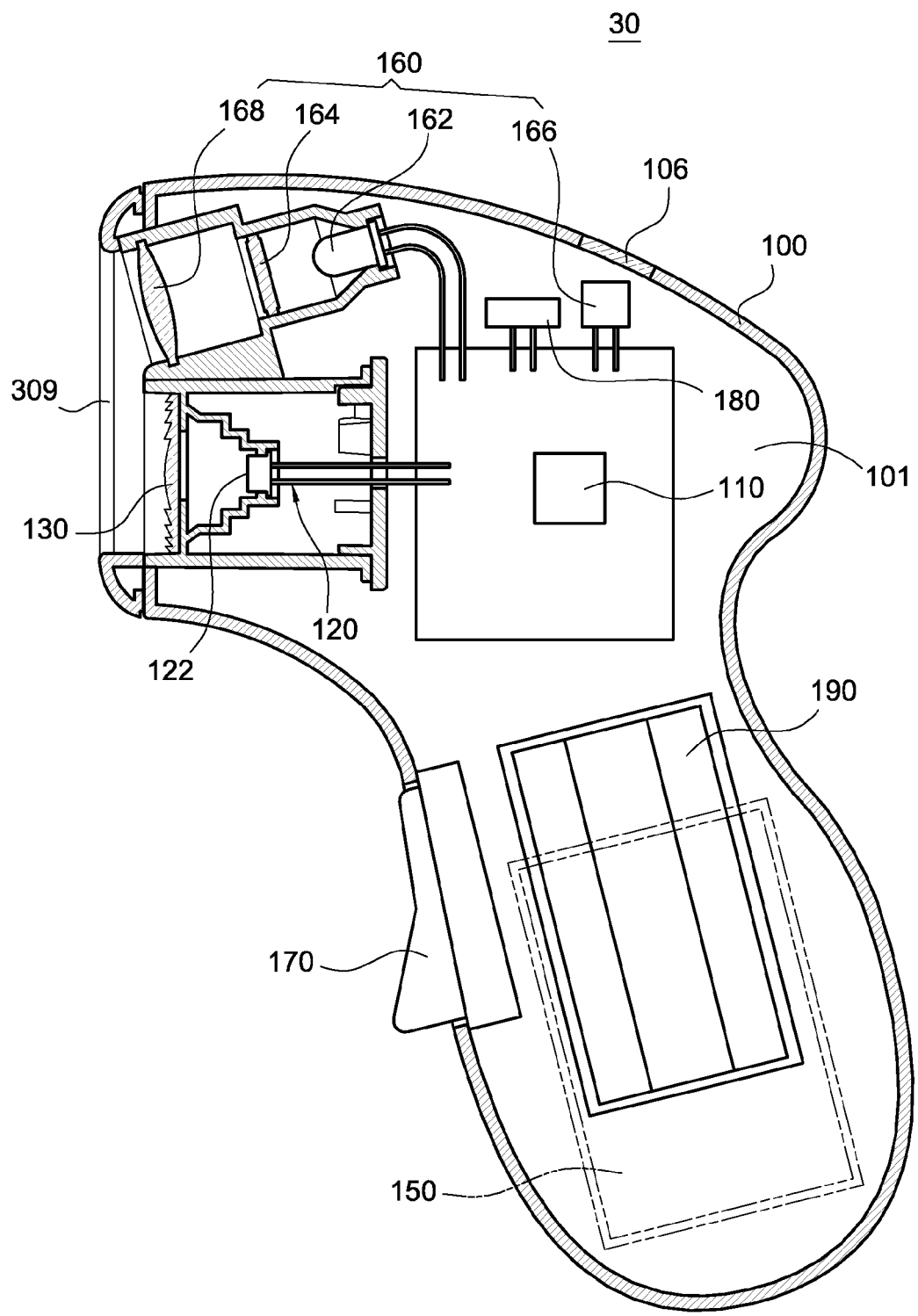
FIG. 6 is a cross-sectional view of an infrared temperature sensing device with projecting function according to a third preferred embodiment.

Reference is made to FIG. 6, which is a cross-sectional view of an infrared temperature sensing device according to a third preferred embodiment of the present invention. The infrared temperature sensing device 30 of this embodiment is similar to the first embodiment mentioned above. The difference is that a temperature-sensing element 120 and a projecting module 160 are respectively disposed within a space 101 of a housing 100 and sensing at least a temperature of a measured body p and projecting a body temperature value or a measuring-identification image via a window 309. In this embodiment, the projecting module 160 is disposed on the temperature-sensing element 120 to reduce the thickness of the housing 100 and the body temperature value or the measuring-identification image can be effectively projected to a projected plane. The projected plane can be, but not limited to, forehead of the measured body p.

To sum up, in the present invention, the infrared temperature sensing device derives the body temperature of the measured body via the temperature-sensing element and projects the body temperature value to the projected plane through the projecting module. Users can conveniently read the body temperature value and the body temperature value can be easily accessed by the visually-impaired persons. Moreover, the infrared temperature sensing device can adjust the intensity of the projecting light according to ambient light so as to prevent erroneous body temperature value reading cause by ambient light.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An infrared temperature sensing device with projecting function used for sensing at least a temperature of a measured body, the infrared temperature sensing device comprising:
   a temperature-sensing element for sensing infrared radiation of the measured body and deriving a temperature signal;
   a Fresnel lens located between the measured body and the temperature-sensing element;
   a microprocessor electrically connected to the temperature-sensing element for processing the temperature signal;
   a projecting module electrically connected to the microprocessor and projecting at least a body temperature value corresponding to the temperature signal; and
   a housing having a space, a first window and a second window separately disposed on the first window, the temperature-sensing element disposed within the space and sensing infrared radiation of the measured body via the first window, the projecting module disposed within the space and projecting the body temperature value via the second window.

2. The infrared temperature sensing device with projecting function in claim 1, wherein the projecting module projecting a measuring-identification image for identifying temperature-measuring position.

3. The infrared temperature sensing device with projecting function in claim 1, further comprising a signal-amplifying circuit electrically connected to the temperature-sensing element and the microprocessor.

4. The infrared temperature sensing device with projecting function in claim 1, wherein the projecting module comprising:
   a liquid crystal displaying plane electrically connected to the microprocessor and showing the body temperature value; and
   an illuminant element disposed on one side of the liquid crystal displaying plane and electrically connected to the microprocessor, the illuminant element emitting light to the liquid crystal displaying plane.

5. The infrared temperature sensing device with projecting function in claim 4, wherein the projecting module further comprising an optical lens located between the liquid crystal displaying plane and the measured body.

6. The infrared temperature sensing device with projecting function in claim 5, wherein the projecting module further comprises a photosensitive element electrically connected to the microprocessor for sensing intensity of ambient light.

7. The infrared temperature sensing device with projecting function in claim 1, further comprising:
   a displaying unit disposed within the housing and electrically connected to the microprocessor and showing the body temperature value;
   a switching unit disposed on the housing and electrically connected to microprocessor;
   a broadcasting unit disposed within the space and electrically connected to the microprocessor; and
   a power disposed within the space and electrically connected to the microprocessor, the temperature-sensing element, the projecting module, the displaying unit, the switching unit and the broadcasting unit for providing the electric power of the infrared temperature device.

* * * * *